United States Patent
Dumoulin et al.

(10) Patent No.: US 9,964,417 B2
(45) Date of Patent: May 8, 2018

(54) CALIBRATION DEVICE AND CALIBRATION METHOD FOR A LASER BEAM HORIZONTAL TRUENESS TESTING DEVICE

(71) Applicant: LEICA GEOSYSTEMS AG, Heerbrugg (CH)

(72) Inventors: Charles Leopold Elisabeth Dumoulin, Balgach (CH); Katherine Broder, Ruggell (LI)

(73) Assignee: LEICA GEOSYSTEMS AG, Heerbrugg (CH)

( * ) Notice: Subject to any disclaimer, the term of this patent is extended or adjusted under 35 U.S.C. 154(b) by 73 days.

(21) Appl. No.: 15/212,212

(22) Filed: Jul. 16, 2016

(65) Prior Publication Data
US 2017/0016743 A1    Jan. 19, 2017

(30) Foreign Application Priority Data
Jul. 17, 2015   (EP) .................................... 15177314

(51) Int. Cl.
*G01C 25/00*   (2006.01)
*G01C 15/00*   (2006.01)

(52) U.S. Cl.
CPC .......... *G01C 25/00* (2013.01); *G01C 15/004* (2013.01); *G01C 15/006* (2013.01)

(58) Field of Classification Search
CPC ..... G01C 15/004; G01C 15/006; G01C 25/00
USPC ................................................... 33/228, 290
See application file for complete search history.

(56) References Cited

U.S. PATENT DOCUMENTS

| | | |
|---|---|---|
| 6,178,649 B1 | 1/2001 | Wu |
| 6,539,638 B1 | 4/2003 | Pelletier |
| 9,644,960 B2 * | 5/2017 | Dumoulin ............ G01C 15/006 |
| 9,766,326 B2 * | 9/2017 | Luthi ...................... G01S 7/497 |
| 9,869,757 B2 * | 1/2018 | Markendorf ............ G01S 7/497 |
| 2005/0193577 A1 * | 9/2005 | Sergyeyenko ....... G01C 15/002 33/290 |

(Continued)

FOREIGN PATENT DOCUMENTS

| | | |
|---|---|---|
| DE | 10 2007 039343 A1 | 2/2009 |
| EP | 2 741 049 A1 | 6/2014 |
| WO | 2009/024381 A1 | 2/2009 |

OTHER PUBLICATIONS

"Ø1.5 Cylindrical Kinematic V-Clamp", Large Clamping Arm Rotates 10° HeNe Lasers, Retrieved from internet URL: http://www.thorlabs.com/catalogPages/199.pdf, Jan. 1, 2007, pp. 199-199.

(Continued)

*Primary Examiner* — Yaritza Guadalupe-McCall
(74) *Attorney, Agent, or Firm* — Maschoff Brennan

(57) ABSTRACT

Calibration device and calibration method for calibration of a laser beam horizontal trueness testing device whereby the calibration device comprises an elongated support body for support of an elongated laser housing with a longitudinal axis and a laser source, whereby a laser beam is emittable in a direction of the longitudinal axis. According to the calibration method, calibration parameters are determined based on at least three impinging positions of the laser beam of the laser housing for at least two different rotational positions of the laser housing in a first face and at least one position of the laser housing in a second opposing face.

20 Claims, 4 Drawing Sheets

(56) References Cited

U.S. PATENT DOCUMENTS

| | | | |
|---|---|---|---|
| 2006/0215179 A1* | 9/2006 | McMurtry | G01B 11/272 356/622 |
| 2010/0019125 A1* | 1/2010 | Stefani | G01J 1/32 250/205 |
| 2015/0308825 A1* | 10/2015 | Dumoulin | G01C 15/006 356/139.1 |
| 2017/0016743 A1* | 1/2017 | Dumoulin | G01C 15/004 |

OTHER PUBLICATIONS

European Search Report dated Jan. 20, 2016 as received in Application No. 15177314.0.

* cited by examiner

CALIBRATION DEVICE AND CALIBRATION METHOD FOR A LASER BEAM HORIZONTAL TRUENESS TESTING DEVICE

FIELD

Some embodiments of the invention relates to a calibration device for calibration of a laser beam horizontal trueness testing device, a calibration method and a calibration system.

BACKGROUND

Laser beam projection apparatuses, such as, for example, point lasers, line lasers or in particular rotation lasers, are used in particular in construction or interior finishing, for example for vertically marking walls. A rotation laser marks a reference plane by means of its rotating laser beam. In this case, the laser beam itself can be emitted for example in a punctiform, linear or fan-shaped fashion. The laser light can be generated as continuous light or in a pulsed fashion. What is important here is that the laser beam is emitted with plane trueness, in particular horizontal trueness, that is to say that it remains exactly in the envisaged plane, in order to be able to preclude incorrect markings. In order to ensure this, conventional lasers of this type are generally equipped with a beam self-leveling functionality. A first adjustment of the horizontal trueness and calibration of the beam self-leveling functionality are typically carried out by the manufacturer prior to delivery of the laser.

At regular intervals or as required, it is necessary to test and recalibrate the plane trueness and/or horizontal trueness of the laser and the beam self-leveling functionality thereof and, if appropriate, to readjust the laser because the adjustment of the laser can change as a result of various external influences, such as, for example, temperature and moisture fluctuations, mechanical shocks, vibrations, etc.

For fulfilling this task, laser beam horizontal trueness testing devices are known and described in the prior art. These known devices usually comprise, as basic components, a telescope and an position sensitive detector for capturing the laser beam of the laser beam projection apparatus and determining out of the impinging position of the laser beam on the detector, if a deviation of an ideal orientation of the laser beam particularly with regard to its horizontality exists which makes a readjustment necessary. For example, such a laser beam horizontal trueness testing device is disclosed in EP 2741049 of May 12, 2012 by the same applicant.

As such a laser beam horizontal trueness testing device is also subject to said external influences, its precision might also diminish, e.g. after special events like shocks or temperature cycling due to a transport of the device. This might have the effect that the assumed point of true horizontality (level point) as defined by the current calibration parameters is not the real point of true horizontality. Therefore, verification of the calibration or to say a new calibration of the testing device itself can be necessary. For fulfilling this task, regular laser beam projection apparatuses are not suitable even if as accurate as specified and not maladjusted. This is, among other reasons, caused by the precision grade of these apparatuses which is not set up/designed to fulfill such a task, due e.g. errors introduced by the ball bearings of a rotational laser.

In contrast, it is possible to (re-)calibrate a laser beam horizontal trueness testing device using a total station, which is capable of providing a laser beam with the required precision.

However, it has to be assured that the total station itself has not been subject to external influences which have deteriorated this complex instrument. Further disadvantages are the significant costs of a total station or of a similar device and their complexity that necessitates a specialized skilled person for handling.

SUMMARY

Some embodiments of the present invention provide a simple and economical device for calibration of a laser beam horizontal trueness testing device.

Some embodiments provide a method for such a calibration device for calibration of a laser beam horizontal trueness testing device The invention provides a calibration device for calibration of a laser beam horizontal trueness testing device. The laser beam horizontal trueness testing device is designed for testing the horizontal trueness of an incoming laser beam and comprises a telescope, an inherent inclination compensator and a position sensitive detector for detecting an impinging position of a laser beam in dependency of the entry angle of the laser beam with regard to the horizontal. The laser beam horizontal trueness testing device is designed for verifying, and possibly carrying out a quantification of, a laser beam horizontal trueness, possibly with a translation of the determined impinging position on the position sensitive detector into a laser beam inclination value on the basis of a translation rule, related to calibration parameters dependent on a position of the position sensitive detector in the telescope. A point of true horizontality on the positions sensitive detector indicates a laser beam of true horizontality. The definition of this point of true horizontality to be represented by calibration parameters is the main objective of calibration.

The calibration device according to the invention comprises an elongated laser housing with a longitudinal axis, containing a laser source. The alignment of the laser source is such that a laser beam is emittable by the laser source at least roughly in direction of the longitudinal axis i.e. the optical axis of the laser source is at least roughly parallel resp. identical to the longitudinal axis. The calibration device further comprises an elongated support body serving for support of the laser housing. The support body comprises at least three points of support which define a support array with a defined inserted direction for insertion of the laser housing whereby the longitudinal axis is parallel to the inserted direction. Therefore, the support body has a predetermined direction for insertion of the laser housing. The size and shape of the laser housing is matched to the support array in such a way that the laser housing is insertable into the support array in a first face in at least two different rotational positions and in a second opposing face in at least one rotational position with the longitudinal axis as axis of rotation each. In other words, in addition to a rotation around the longitudinal axis, the laser housing can also be flipped over so that the laser source is pointing to the other side. Each contact area at the points of support in direction orthogonal to the longitudinal axis is punctiform.

The device designed in said way has the effect that in each face and each rotational position of the laser housing the laser housing rests position-stable and self-centered due to gravity in the support array and the position of the longitudinal axis is equal.

This means that due to the size and shape of the laser housing and the support body according to the invention there are at least three highly stable and well defined different positions available for the laser housing in the support body whereby the longitudinal axis remains unchanged when changing the laser housing from one face resp. rotational position to another.

Advantageously, the laser housing and/or the support body are precision ground, smooth and surface hardened. Optionally, the laser housing and/or the support body are single piece units, preferably made of a single piece of high-speed steel, glass or ceramics and optionally made of a material with a low coefficient of thermal expansion, e.g. in the range of 0 to $9 \cdot 10^{-6} K^{-1}$ (absolute value).

Optionally, the support body is designed as a block with a v-shaped and the laser housing is designed as a straight cylinder. Alternatively, the support body is designed as a block with a u-shaped support array or as two bars parallel to each other and to the inserted direction, and the laser housing is designed as a straight cylinder or a straight prism. This or similar designs have the objective to provide points of support that form (two) lines parallel to the inserted direction resp. parallel to the longitudinal axis of the laser housing, whereby each line may have gaps in between. Alternatively the points of support are designed as single points spaced to each other, which is for example achieved by a support body comprising single spheres or balls which provide the support points. Also, both alternatives may be mixed e.g. in such a way that one side of the laser housing is supported by a line of support points and the other side is supported by one or more single support points, wherefore one part of the support body provides a plane area and the other one or more spheres.

In accordance with one possible embodiment of the invention, both ends of the laser housing are enclosed by a sleeve each, whereby the sleeves are precision ground, smooth and surface hardened. Thus, the laser housing comprises two rings of the same diameter of limited width that are ground circular. Optionally, each sleeve is designed as the race of a bearing or as a fixed ball bearing.

As an option, the laser source is designed as a line laser. As another option, the alignment of the laser source is adjustable, e.g. by adjustment unit at its fixation to the laser housing, wherefore the direction of the laser beam is adjustable.

In accordance with one possible embodiment of the invention, the laser housing comprises at least one marking on its external surface for indication of at least one rotational position. Preferably, the laser housing comprises two markings indicating two rotational positions which are separated by 180°. Advantageously, the two markings are clearly distinguishable, which allows a user or a sensor to clearly distinguish both rotational positions. Optionally, the laser housing comprises even more marks which mark defined rotational positions, e.g. six marks spaced 60° to each other. The marks are optionally designed as an alignment reticle.

In accordance with another possible embodiment of the invention, the support body comprises at each end a stopper plate as limitations of the support array in the inserted direction, which facilitates the insertion of the laser housing. Advantageously, one stopper plate comprises alignment slots or alternatively a single mark for defined alignment of the laser housing to the support array, whereby optionally the alignment slots (or the alignment mark) are matched with alignment marks of the laser housing.

The calibration method according to the invention is carried out using the calibration device as described above. The method involves determining an impinging position of the laser beam of the laser source on the position sensitive detector with the laser housing in at least two different rotational positions of a first face and at least one rotational position of a second opposing face each, resulting in a first, second and at least a third impinging position, and determining calibration parameters, particularly calibration parameters representing the point of true horizontality, based on the first, second and third impinging position.

Through the measurement of at least three impinging positions for at least two different rotational positions and in two opposing faces (180°-flip over of the laser housing) and due to the unchanged longitudinal axis achieved by the design of the calibration device according to the invention, uncertainties regarding the direction of the laser beam are cancelled out, in such a way that so to say in "average" a perfectly horizontal laser beam is obtained, wherefore out of all three impinging positions calibration parameters are determinable, particularly calibration parameters describing the point of true horizontality resp. the point of true horizontality itself.

Optionally, the calibration method involves determining not only one, but at least two impinging positions of the laser beam with the laser housing in at least two different rotational positions in the second opposing face each, resulting in the third and additionally a fourth impinging position, and determining calibration parameters from an average of the first, second, third and fourth impinging position.

Alternatively or additionally, the method involves canceling out a cone error of the laser source based on two impinging positions of the laser beam with the laser housing in at least two different rotational positions in one face, whereby the rotational angle between the two different rotational positions is known. Preferably, the known rotational angle is 180°

$$\left(\frac{\pi}{2}\right).$$

Cone error means an error resulting from a laser beam not perfectly aligned to the longitudinal axis of the laser housing, e.g. due to a sloping fixation of the laser source in the laser housing, wherefore the laser beam direction in one rotational position is slightly different to its direction in another rotational position. As part of canceling out the cone error, the cone error itself is optionally also determined such that its concrete value is measured. Instead of two rotational positions with a known angle in between, at least three impinging positions for at least three different rotational positions, preferably with maximum distance between them, of the laser housing are determined whereby the rotational angles in between need not to be known for canceling out resp. determining a cone error.

Alternatively or additionally, the method involves canceling out (or determining) a plane error of the laser source based on the impinging positions of the laser beam in the first and in the second opposing face. Plane error means a deviation from a perfectly leveled position of the laser source, e.g. due to a tilt of the laser housing or the support body. If the rotational position (with regard to the longitudinal axis) is defined resp. known, at least one impinging position in the second face is measured. If the rotational position is not defined, at least two impinging positions for two different rotational positions in the second face are measured.

In other words at least three impinging positions are determined, therein two impinging positions in the same face for two different rotational positions. Depending on whether rotational positions are well-defined resp. known or not, further impinging positions are facultative or mandatory.

In a further development of the calibration method, the method involves determining at least one additional impinging position of the laser beam of the laser source on the position sensitive detector for a known rotational position in azimuthal direction of the laser beam horizontal trueness testing device different to the rotational position of the laser beam horizontal trueness testing device underlying at least one other impinging position. This variation of the orientation of the laser beam horizontal trueness testing device is used for determining calibration parameters representing a yaw angle of the position sensitive detector (rotation of the detector), based on the additional impinging position. Particularly, two additional impinging positions for two rotational positions of the laser housing are measured. By this further development of the calibration, the calibration method allows not only determining calibration parameters representing a position of the position sensitive detector with respect to translation, but also with respect to rotation.

Optionally, the calibration method involves a pre-step before determining an (first) impinging position. The pre-step comprises orienting the laser beam of the laser source to the preciously defined center of the position sensitive detector, whereby the center is defined by the currently available, so to say "old" calibration parameters. This ensures that plane and cone are near to level at the onset of the test (under the condition of course, that the real/current center resp. level point of the detector that is to be "found" by the present calibration has not drifted exorbitantly from the center as represent by the "old" calibration parameters). This reduces potential non-linearities caused by the detector orientation and/or optical units.

As another option, the cone error is explicitly determined as described above and in the case, that the cone error exceeds a certain limit, e.g. is bigger than 20 or 30 seconds of arc, it is reduced by adjusting the laser beam, preferably in both horizontal (yaw) and vertical angle (pitch). If the laser source is designed in such a way that the laser beam is line-shaped, the rotational angle between to rotational positions of the laser housing is optionally determined based on the orientation of the laser line on the position sensitive detector in each rotational position.

A further subject of the invention is a computer program product having program code which is stored on a machine-readable carrier, for controlling and carrying out the method for calibration according to the invention.

Another subject of the invention is a system comprising a calibration device according to the invention and a computer program product according to the invention. Optionally, the system further comprises a laser beam horizontal trueness testing device as described above, whereby the laser beam horizontal trueness testing device comprises a control unit designed to execute the program code of the computer program product.

Another subject of the invention is the use of a calibration device according to the invention for calibration of a laser beam horizontal trueness testing as described above.

In an alternative embodiment of the calibration device for a laser beam horizontal trueness testing device, the laser beam horizontal trueness testing device comprising an inherent inclination compensator and a position sensitive detector for detecting an impinging position of a laser beam in dependency of the entry angle of the laser beam with regard to the horizontal, the calibration device comprises a laser housing with a longitudinal axis, a laser source and a compensator. The alignment of the laser source is such that a laser beam is emittable by the laser source at least roughly in direction of the longitudinal axis. The compensator levels the laser beam horizontally and virtually eliminates the plane error. In a preferred embodiment, the compensator according to the invention is designed as an optomechanical self-leveler having an optomechanical element, in a simple case e.g. as a bubble sensor or vial, for the self-leveling of the optical axis of the laser, said optomechanical element being arranged in the laser beam path inside the laser housing, or as an electronic inclination considered having a high-precision inclination sensor for ascertaining a inclination value of the laser housing dependent on a current inclination position of the laser housing. Further, the laser housing is positioned on a unit, which is rotatable in azimuthal direction, with an angular position measurement system, by which the laser housing is orientatable in different azimuthal directions with known azimuthal angles (e.g. using an electronic encoder). In other words, the laser beam is emittable in defined different horizontal directions. Preferable, the rotatable unit is a turntable with an angular position measurement system such as an angular encoder. It is obviously to a person skilled in the art, that features like the compensator or turntable of this alternative embodiment can be combined with embodiments as described above.

The alternative calibration method in accordance with the alternative embodiment of the calibration device involves determining an impinging position of the laser beam of the laser source on the position sensitive detector of the laser beam horizontal trueness testing device with the laser housing in a first azimuthal orientation and in a first rotational position and a second opposing rotational position each, whereby the laser housing is in a first azimuthal orientation and a first face. This results in a first and second impinging position. The calibration method involves further cancelling out resp. determining a cone error of the laser source based on the first and second impinging position. The method involves further determining an impinging position of the laser beam of the laser source on the position sensitive detector with the laser housing in at least one rotational position of a second opposing face, resulting in a third impinging position, and determining calibration parameters representing the point of true horizontality based on the first, second and third impinging position. Further, at least a fourth impinging position of the laser beam of the laser source on the position sensitive detector is determined, whereby the laser housing is in a second azimuthal orientation different to the first one. The level variation of the laser beam while turning from the first to the second azimuthal orientation (plane error) is corrected for by the compensator. The known azimuth positions can be provided for by an electronical encoder or by means of known mechanical stop positions. Calibration parameters are determined representing the yaw angle and the scale of the positions sensitive detector, based on the first, second and fourth impinging position. Scale of the position sensitive detector refers to the capability of the laser beam horizontal trueness testing device not only to detect a deviation of a laser beam from horizontal trueness, but also to quantify the extent of that deviation of a laser beam from horizontal trueness. As an option, the determination of a second impinging position in the second opposing face and accordingly a cone error based on the first and second impinging position is skipped.

The present invention provides advantageously a calibration device and a calibration method for (re-)calibration of a laser beam horizontal trueness testing device at the user's resp. in the field. The calibration device and the according calibration method provides in particular the advantage that a (re-) calibration can be done in a simple, short and therefore cost-effective way and nevertheless with the precision necessary for a laser beam horizontal trueness testing device. In contrast to a sophisticated device like a total station which might also be suitable for a calibration, the calibration device according to the invention is uncomplicated and considerably less costly. Due to its very simple and straight-forward structure and thus the non-necessity of fasteners or the like prone to aging, the proposed calibration device is trouble-free and not prone resp. permissive to errors resulting from manufacturing or external influences. The system according to the invention comprising the calibration device and laser beam horizontal trueness testing device with a control unit designed for executing the according calibration procedure is easy to use even for non-specialized users.

BRIEF DESCRIPTION OF THE FIGURES

The device according to the invention and the method according to the invention are in this case furthermore described in greater detail purely by way of example below on the basis of concrete example embodiments illustrated schematically in the drawings, further advantages of the invention also being discussed. Specifically in the figures.

DETAILED DESCRIPTION

Figure 1A:
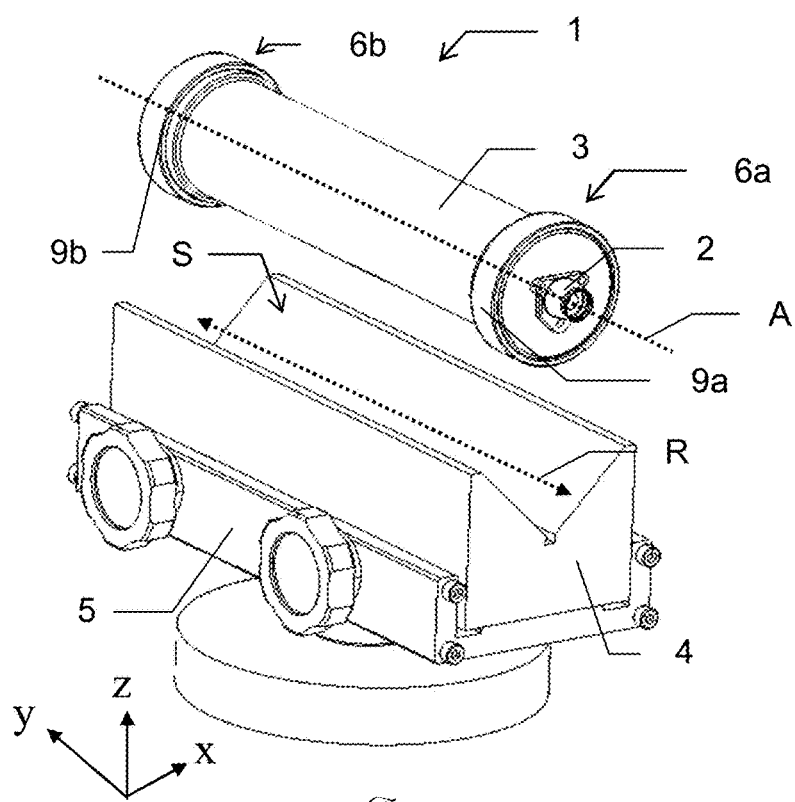
FIGS. 1*a*-*c* show different views of an embodiment of a calibration device according to the invention.
Figure 1B:
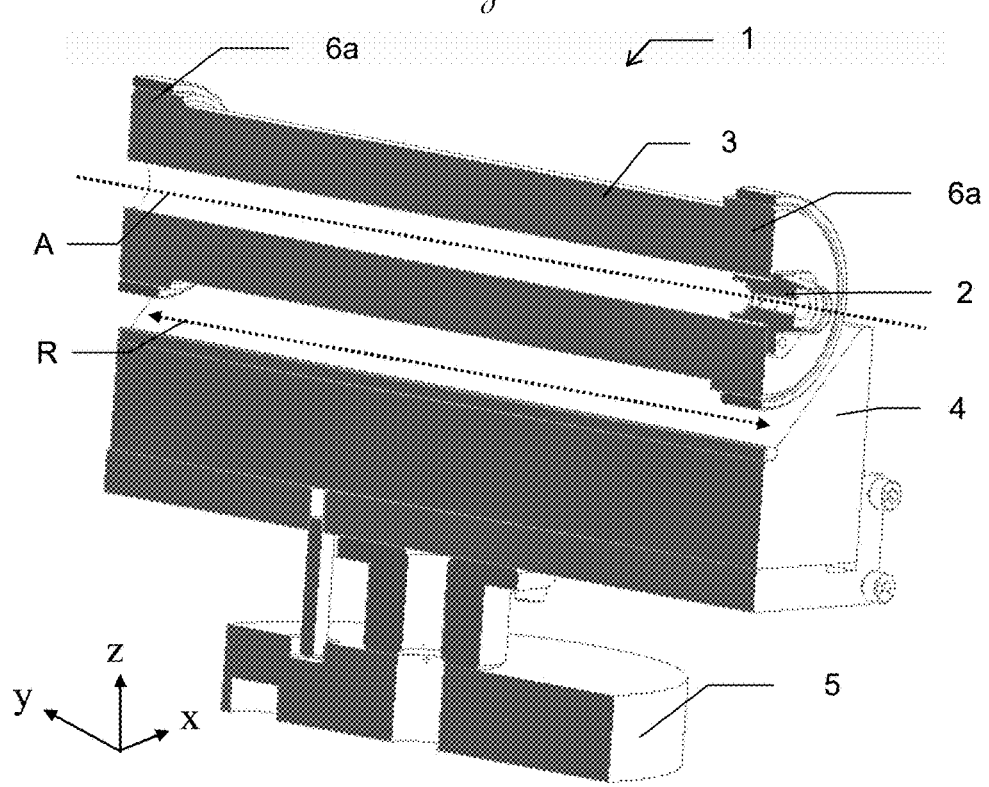
Figure 1C:
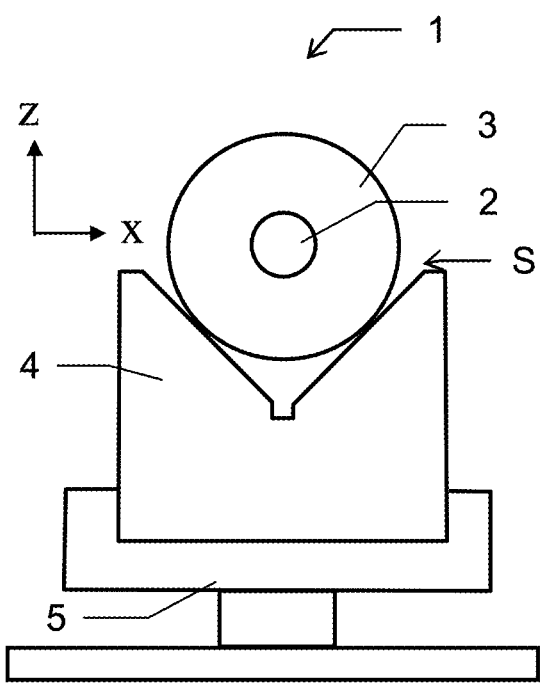

FIG. 1*a*-1*c* show one possible embodiment of a calibration device 1 according to the invention for calibration of a laser beam horizontal trueness testing device. It comprises an elongated v-groove bearing block (v-block) 4 as a support body, which in this example is positioned on a levelling base 5, and an elongated laser drum 3 with a longitudinal axis A as a laser housing. FIG. 1*a* is a 3D-view where the v-block 4 and the laser drum 3 are drawn separated from each other for overview purposes. FIG. 1*b* is a 3D-cross section view along the length of the drum 3 and the v-block 4, sectioned along a zy-plane, FIG. 1*c* is a 2D-cross section view, sectioned along the zx-plane. In FIGS. 1*b* and 1*c* the laser drum 3 is in its intended position for the calibration process according to the invention, lying onto the v-block 4. The v-block 4 is holding the laser drum 3. The optional levelling base 5 allows levelling the device 1 at setup. The levelling of the v-block 4 does not need to be precise as the levelling plane is determined during the measurement process as described below (see FIGS. 5*a*-5*d*).

The laser drum 3 is in principle a strung-out hollow cylinder with a laser source 2 in the center of its end 6*a*, such that the laser beam from the laser source 2 propagates along the inner of the cylinder (y-direction) before leaving the laser drum 3 and at least roughly in direction of the longitudinal axis A. Preferably, the drum 3 is made of a single piece of precision ground, smooth and preferably (surface) hardened material like high speed steel, ceramics or glass. As a further option, in addition materials are chosen with low coefficient of thermal expansion like special ceramics. The manufacturing of the laser drum 3 can be done as a single piece in one setup at low to moderate cost. The laser drum 3 only requires two rings of the same diameter of limited width that are ground circular. In the preferred embodiment as shown, both ends 6*a*, 6*b* of the drum 3 are fitted with an inner race of a needle bearing 9*a*, 9*b*, which is hardened, precision ground and a low cost of the shelve component. The drum 3 is resting on to the bearing races inside the v-block 4, wherefore the size of the laser drum 3 and the v-block 4 are matched to each other such that the laser drum 3 rests stable onto the v-block 4 solely by gravity without any connection means. A preferable value for the length of the laser drum 3 and accordingly the v-block 4 is about 150 mm-200 mm. A greater length makes the positioning of the laser drum 3 more stable but results in a more bulky device. In other words, the longer the v-block 4, the lower the accuracy requirements on the components used but the less handy is the apparatus.

It is possible to manufacture the laser drum 3 composed of sub components. For instance, the center of the drum 3 can consist of a simple aluminum pipe. On to each end of the pipe a seat is machined to hold a common deep groove roller bearing. Two roller bearings are pressed on to the pipe. Each roller bearing is specially treated, to prevent the outer race of the roller bearing from rotating. Such a treatment can for instance be simple degreasing of the roller bearing followed by a gluing step where the outer bearing is glued against the inner bearing. Another method of securing the outer race to the inner race could be a mechanical clamping mechanism. Instead of using bearings, pre-ground solid rings are used (for instance the inner or outer races only). As a further alternative, the alignment and accuracy of the guiding surfaces of the laser drum 3 are machined once more in a final machining step. The different manufacturing solutions are tradeoffs between accuracy, availability and cost. The inaccuracies introduced by manufacturing tolerances are fixed with the each component. These deviations will not change with thermal cycling wherefore these deviations can be determined ex-factory in a calibration step.

The v-block 4 is also precision ground, smooth, hardened and an off-the-shelve-part. The v-block 4 can be easily ground as a single block in one setup and machined with high accuracy. Since the machining of the v-block 4 is relatively easy, it can be produced at low to moderate cost. For the v-block 4 similar material choices apply: hardened, precision ground and preferably low thermal expansion coefficient.

The parts (v-block 4, drum 3) need to be made with moderate to high precision. Assuming the drum 3 has a centering tolerance difference of 20 µm. A thermal expansion coefficient of $20 \cdot 10^{-6}$ results in a 0.4 nm centering change per ° C. Depending on the length of the drum 3, the thermal change necessary to be noticeable needs to be 70° C. or more. This thermal range is well beyond normal office conditions. Using materials with low thermal expansion coefficients virtually eliminates this potential thermal influence even at gross manufacturing error tolerances.

The v-shape of the block 4 opens a support array S with a defined inserted direction R, where the laser drum 3 can be inserted with its longitudinal axis A parallel to the inserted direction R in two opposing faces. The block 4 does not necessarily have to be v-shaped: as an alternative to a v-shaped block 4, multiple other forms are suitable as a supporting part 4 that for the laser drum 3 which provide smooth and stable support of the laser drum 3 in a support array S with a inserted direction D and a minimized contact area between the laser housing 3 and the support body 4 for at least three different positions of the laser housing 3, e.g. a u-shaped block or two adjacent parallel bars/cylinders. Likewise, the laser containing body 3 does not have to be designed as a drum or a cylinder (see also FIG. 2). Multiple other forms are possible for the laser housing 3, which allow a self-centering onto the supporting part 4, like a v-block on one side and a ball/sphere on the other side (two lines, one point of contact).

Figure 2:
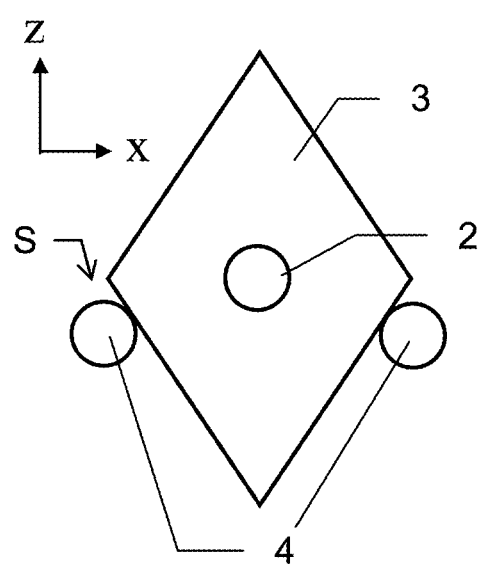
FIG. 2 shows a cross section view of a second embodiment of a calibration device according to the invention.

FIG. 2 shows such an alternative embodiment of a calibration device 1 in a schematic cross section view, where the laser body 3 containing the laser unit 2 is designed as a straight (hollow) prism instead of a cylinder, whereby in the example the cross-section/base area of the prism is formed as a rhombus. Preferably, the rhombus is not (completely) regular but its width is smaller than its length such that the laser body 3 has a preferred up/down-orientation. The laser housing 3 is supported by a supporting body 4 designed in essence of two parallel bars and a supporting substruction (the latter not shown). The parallel bars have a distance to each other wherefore a support array is in between them, whereby the distance is slightly smaller than the width of the laser body 3 such that the center of gravity of the laser body 3 is as low as possible and the laser body 3 therefore rests stable onto the bars. As an alternative to two continuous bars, the supporting body 4 is further "reduced" to four balls/spheres or needles situated in one common plane, a pair each at or near each end of the laser body 3. The bars, balls etc and their substruction are—likewise the block described above—preferably hardened, precision ground and preferably with a low thermal expansion coefficient to guarantee a stable support for the laser housing 3.

Figure 3:
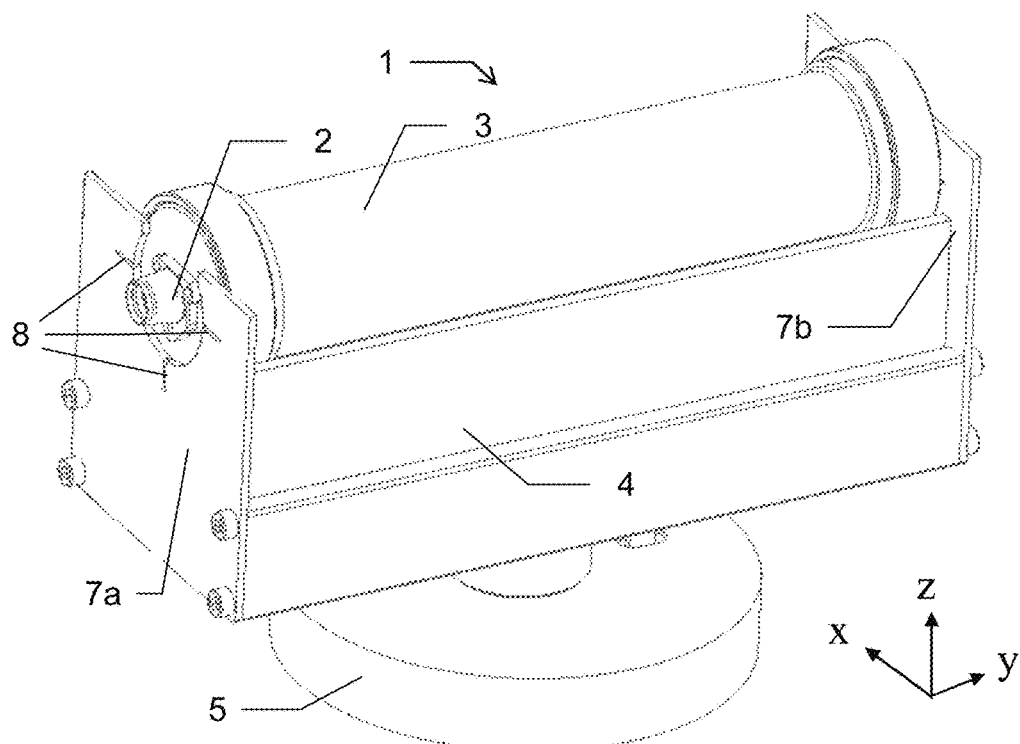
FIG. 3 shows a further development of the embodiment of FIGS. 1*a*-*c* of a calibration device according to the invention.

FIG. 3 shows a further embodiment of a calibration device 1, based on the embodiment shown in FIGS. 1a-1c. At both sides of the v-groove holder 4 a stopper plate 7a, 7b is mounted. Each stopper plate 7a, 7b has machined visual alignment slots 8. The laser drum 3 also has an alignment reticle (see FIG. 4). Together with the alignment reticle, the machined alignment slots 8 aid orienting the laser drum 3 in the v-block 4.

Figure 4:
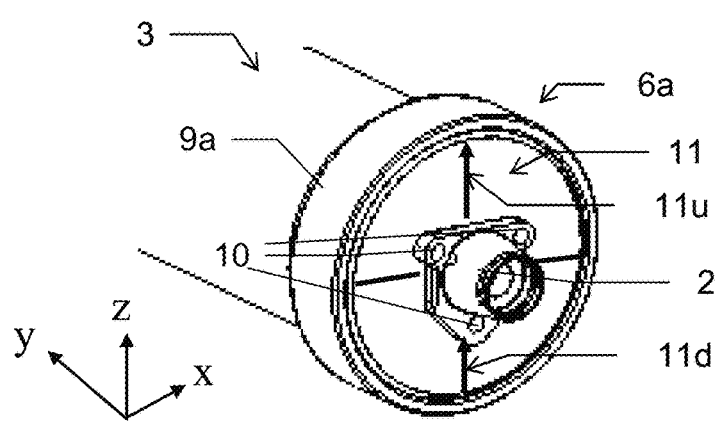
FIG. 4 shows a detail of an embodiment of a laser housing of a calibration device according to the invention.

FIG. 4 shows one end 6a of a laser drum 3 with an alignment reticle 11. The alignment reticle 11 is glued on to the end 6a holding the laser (the side facing the user). To prevent confusion of the orientation of the laser drum 3, one line segment 11u of the reticle label 11 of the drum 3 is pointing outwards, the 180° opposing line segment 11d of the reticle is pointing inwards. Alternatively, two 180°-opposing sides of the whole laser drum 3 are marked with lines of different colours or shape (see FIGS. 5a-5d) to indicate "up" and "down". In addition to the 180° opposing markings additional markings are optionally placed. These markings help in characterizing the laser drum 3 in case of gross manufacturing errors.

In the example, the laser drum 3 further comprises adjustment screws 10 for adjusting the laser source 2. In this preferred embodiment the laser 2 mounted in the center of the laser drum 3 is adjustable over its horizontal angle as well as its vertical angle (yaw and pitch angles) with the help of the adjustment screws 10. Alternatively, the laser diode mounting is fixed to the laser drum 3 with mounting and alignment tolerances as determined by the manufacturing process chosen. As the laser beam horizontal trueness testing device to be verified normally is collimated, it is sufficient to align the translation of optical axis of the laser source 2 only roughly with the mechanical center of the drum 3.

FIGS. 5a-5d show an example of calibration method according to the invention for a laser beam horizontal trueness testing device 50, comprising a position sensitive detector 51 and a telescope with an objective. The center of the position sensitive detector 51 is arranged on the optical axis of the objective of the laser beam horizontal trueness testing device 50. An evaluation unit of the laser beam horizontal trueness testing device 50 is designed for automatically determining an impinging position of the laser beam captured by the detector 51 on the basis of image processing. Calibration parameters stored in the evaluation unit represent e.g. the imaging position of the optical axis of the objective on the position sensitive detector 51 and, in particular, a direction in the image which represents an offset direction—brought about hypothetically by a pure horizontality error—of a laser beam impingement position on the detector 51.

For the translation of the determined position on the position sensitive detector 51 into a laser beam inclination value, preferably a distance is ascertained which is present in the image captured by the detector 51 between the impinging position and the imaging position in that direction which is assumed as direction or is stored in the calibration parameters and which represents an offset direction—brought about hypothetically by a pure horizontality error—of a laser beam impingement position on the positions sensitive detector 51. Said distance—in particular in accordance with a translation factor defined by the objective imaging ratio—can be translated into the laser beam inclination value.

For calibration/determining calibration parameters, four measurements/measurement steps are made. Each step is described with reference to one of the FIGS. 5a-5d.

Figure 5A:
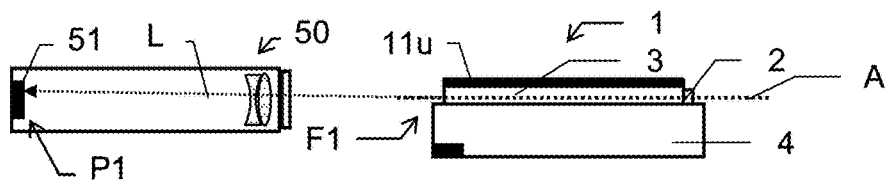
FIGS. 5*a*-*d* show schematically a calibration method according to the invention.

FIG. 5a shows the set-up for the first measurement. The laser drum 3 lies onto the v-block 4 pointing into a first face F1 (to the left side in the figure, laser source 2 at the right end of the v-block 4), the v-block 4 leveled only roughly wherefore the horizontal direction of the laser beam L shows possibly a plane error. The laser beam horizontal trueness testing device 50 to be calibrated is positioned such, that the laser beam L of the calibration device 1 is imaged on the position sensitive detector (image sensor, provided for example as a CMOS or CCD chip) 51 of the laser beam horizontal trueness testing device 50. Again, there is no need to position the calibration verification device 1 and the laser beam horizontal trueness testing device 50 relative to each other in an exact way of some sort. In this arrangement, a first measurement of a first impinging position P1 of the laser beam L on the position sensitive detector 51 is made i.e. an image position of the laser beam L captured in the image is determined on the basis of image processing.

Figure 5B:
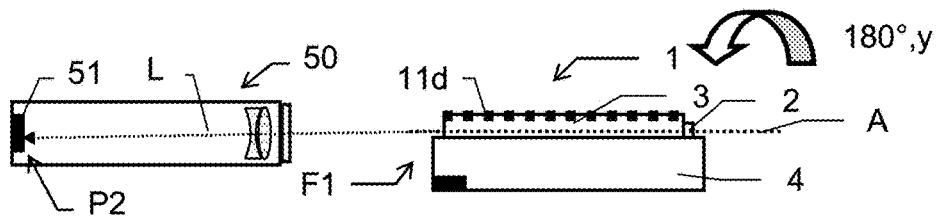

FIG. 5b shows the set-up for the second measurement. The laser drum 3 is still in the first face F1, but has been rotated 180° around the y-axis, such that compared to the set up of FIG. 5a, the laser drum 3 is lying on its "back". The rotation is done with the help of a marking line 11d indicating "down" (see also FIG. 4). In this arrangement, a second measurement of a second position P2 of the laser beam L on the sensor 51 is made, which normally is different to the first impinging position P1 due to a cone error of the laser beam L.

Figure 5C:
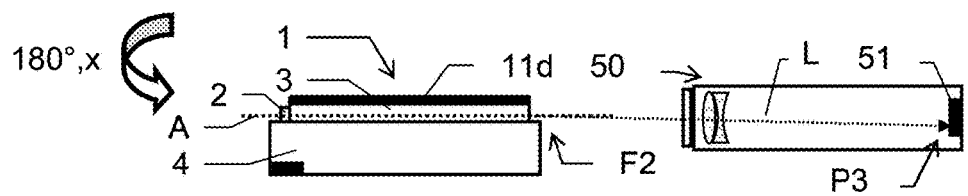
Figure 5D:
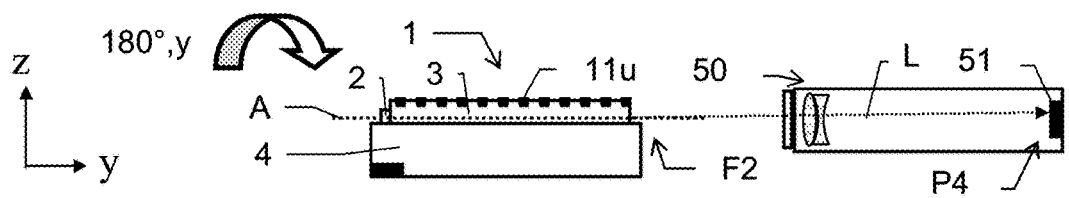

Next, the laser drum 3 is flipped over so that the laser source 2 is in the second opposing face F2, pointing to the other side (180° rotation of the laser drum 3 around the x-axis of the v-block 4) as shown in FIG. 5*c*. In this manner, it is possible to have the laser drum 3 in one position pointing to the front of the v-block 4 (FIGS. 5*a* and 5*b*), and in the other position pointing to the back of the v-block 4 (FIGS. 5*c* and 5*d*). Accordingly, the laser drum 3 is now lying with its "bottom" side on the v-block 4 again, likewise in FIG. 5*a*, which is indicated by the marking line 11*u* indicating "up". Of course, the laser beam horizontal trueness testing device 50 is now positioned on the other side of the calibration device 1 such that the laser beam L of the calibration device 1 is imaged on its position sensitive detector 51. In this third arrangement, a third measurement of a third impinging position P3 of the laser beam L on the position sensitive sensor 51 is made.

Gravity presses the laser drum 3 on to the v-block. The laser drum 3 has less mass compared to the v-block 4 and is repositioned at the same contact position in the v-block 4 when rotated around the x-axis. This results in no change of the center point of gravity of the setup when flipping over. There is no play between the v-block 4 and laser drum 3. The accuracy of this measurement principle therefore is determined by the manufacturing accuracy of the v-block 4 and the laser drum 3.

FIG. 5*d* shows the fourth and possibly final set-up. The laser drum 3 is still in the second face F2, but has been rotated 180° around the y-axis, such that compared to the set up of FIG. 5*c*, the laser drum 3 is lying on its "back". In this fourth arrangement, a fourth measurement of a fourth impinging position P4 of the laser beam L on the position sensitive detector 51 is made which again differs form the third position P3 due to cone error. Due to the plane error caused by the non-exact levelling the third and fourth impinging positions P3, P4 are not reverse to the first and second impinging positions P1, P2 but show an offset, dependent on the quantity of the deviation from perfect level. It is to be noted, that the position of the v-block 4 remains unchanged during the measurement procedure. It is further to be noted, that the position of the longitudinal axis A in all four positions of the laser housing 3 is equal, what is achieved by the design of the calibration device 1 according to the invention.

The rotation of the laser drum 3 around the y-axis of the v-block 4 (FIGS. 5*a* to 5*b* and 5*c* to 5*d*) is done in order to determine the cone angles resp. eliminate the cone errors of the laser source 2 resp. its laser beam L. Cone error is misalignment of the laser beam L in radial direction from the intended laser beam orientation. Alternatively to two 180° opposing drum orientations, an ellipse on to the measurement results at multiple (at least three) non-opposing orientations of the laser drum 3 is fitted. In case an adjustable laser source 2 is chosen for the laser drum 3, the cone error of the laser source 2 in the laser drum 3 can be adjusted in both horizontal (yaw) and vertical angle (pitch). By adjusting both angles can be controlled to be substantially less than for example 30 seconds of arc.

The rotation of the laser drum 3 around the x-axis of the v-bock 4 (change from first face F1 to second face F2, FIGS. 5*b* to 5*c*) is done in order to determine the laser plane resp. laser line of the laser beam L resp. in order to even out the non-exact levelling of the laser plane resp. laser line resp. the non-exact levelling of the whole calibration device 1 (see FIG. 1). As said, by rotating the laser drum 3 around the length axis of the v-block (y-axis), it is possible to align the laser source 2 mounted in the center of the laser drum 3 in such a way that the cone errors in horizontal direction (rotation around z-axis) and vertical direction (rotation around x-axis) are cancelled. In practice, perfect alignment of the laser source 2 in the laser drum 3 is not necessary, as the distortion of the optics of the laser beam horizontal trueness testing device 50 are small and the position of the position sensitive sensor 51 to the optical axis of the laser beam horizontal trueness testing device 50 is near orthogonal.

The level point, i.e. the impinging position on the positions sensitive detector 51 for an impinging laser beam of true horizontality, of the laser beam horizontal trueness testing device 50 is the center of the four image sensor positions P1-P4 measured. Therefore, the real center position of the optical axis projected to the position sensitive detector 51 of the laser beam horizontal trueness testing device 50 is obtained by averaging all four measurement results P1-P4. Thus, the calibration of the laser beam horizontal trueness testing device 50 is finalized in essence and the level point is newly set by the newly determined calibration parameters.

The averaging and calibration is preferably done by a control unit (not shown) of the laser beam horizontal trueness testing device 50, wherefore in control unit is implemented a program for a calibration verification functionality for a laser beam horizontal trueness testing device 50. Optionally, the method respectively calibration functionality comprises multiple readings to improve the standard deviation of the resulting center position resp. level point. Taking multiple readings at multiple orientations of the drum 3, each 180° opposite further improves the result. If the determined cone error is larger than 10" it can be reduced using the adjustment screws at the laser source 2.

If the laser source 2 is designed as a line laser source, it allows in addition measurement of the rotation angle over which the laser drum 3 was rotated by measurement of the angle of the projected line to the orientation of the position sensitive detector 51. By measuring the difference of the line angles between the two cone error measurements, the actual rotation angle can be determined. In case of a line laser source, the cone angle in inclination direction is measured as the orthogonal distance between the sensor center and the projected laser line.

The effect of cone errors at a certain orientation of the drum 3 around the y-axis is covered by sine and cosine laws. Measurement errors introduced by angular misalignment of the laser drum of the intended 180° opposing orientation of cone compensation and the actual orientation are therefore affected by the derivatives of the sine and cosine laws. This means that in case the cone error of the laser source 2 is reduced by prior adjustment to say 30 seconds of arc and the user makes an alignment error of 5 degrees in the orientation of the drum, the cone compensation measurement is only affected by 0.1 seconds of arc. As a result, it is not necessary to have accurate angular alignments of the laser drum 3 when determining its cone error. It is sufficient to have simple marks 11*u*, 11*d* (see also FIG. 4) on the circumference of the drum 3, marking both opposite positions, 180° apart and manual rotation and visual feedback. Same holds for the front-back alignment (flip over, FIGS. 5*b* to 5*c*) of the laser drum 3 in the v-block 4.

The measurement method uses the property of the opto-mechanical tilt adjustment device (compensator) in laser beam horizontal trueness testing device 50. The compensator ensures that the optical line of sight of the laser beam horizontal trueness testing device 50 is always leveled (setting accuracy typically <0.3 seconds of arc and linearity error of typically <1 second of arc"/10 minutes of tilt), providing certainty of the optical line of sight. The level of the laser beam horizontal trueness testing device 50 can be adjusted within the working range of the compensator. The accuracy of the compensator allows moving the laser beam horizontal trueness testing device 50 from front to back of the v-block 4 without significant impact on measurement resp. calibration accuracy. By moving the laser beam horizontal trueness testing device 50 from the front of the v-block 4 to the rear of the v-block 4 the laser plane resp. laser line of the v-block 4 setup can be accurately determined. In this process the laser drum 3 is to be rotated around the x-axis to point in front/rear direction.

When moving the laser beam horizontal trueness testing device 50 from front to back of the v-block 4 (FIGS. 5b to 5c), the laser beam horizontal trueness testing device 50 needs to be positioned in the same horizontal angular alignment as where it was in the front. This is roughly achieved using the side drive of the laser beam horizontal trueness testing device 50. As an option to increase the precision of the alignment, the center of position sensitive detector 51 of the current calibration parameters is used. The deviation of the current position in the front setting from the detector center is determined. Combined with the current orientation parameter of the position sensitive detector 51, the offset of the new position when the laser beam horizontal trueness testing device 50 has been moved to the back of the v-block 4 to the correct position is calculated and corrected for.

The side drive of the laser beam horizontal trueness testing device 50 allows its azimuthal rotation. This is used in a further development of the calibration method: using the known laser plane and cone angles after the initial measurements, the rotation of the position sensitive detector 51 around the y-axis is determined by azimuthal rotation of the laser beam horizontal trueness testing device 50 over a known angle. The azimuthal angle over which the horizontal trueness testing device 50 was rotated is determined by the horizontal trueness testing device 50 itself. With known azimuthal rotation angle and known plane and cone errors, the rotation of the position sensitive detector 51 around the y-axis resp. a deviation from its ideal rotational position is determined.

What is claimed is:

1. A calibration device for calibration of a laser beam horizontal trueness testing device, the laser beam horizontal trueness testing device comprising:
    an inherent inclination compensator and a position sensitive detector for detecting an impinging position of a laser beam in dependency of the entry angle of the laser beam with regard to the horizontal,
the calibration device comprising:
    an elongated laser housing with a longitudinal axis, containing a laser source, whereby the alignment of the laser source is such that a laser beam is emittable by the laser source at least roughly in direction of the longitudinal axis, and
    an elongated support body serving for support of the laser housing,
    wherein
    the support body comprises at least three points of support which define a support array with a defined inserted direction for insertion of the laser housing with its longitudinal axis parallel to the inserted direction and the size and shape of the laser housing is matched to the support array in such a way that
    the laser housing is insertable into the support array in a first face in at least two different rotational positions and in a second opposing face in at least one rotational position with the longitudinal axis as axis of rotation each and
    each contact area at the points of support in direction orthogonal to the longitudinal axis is punctiform,
    by which in each face and each rotational position of the laser housing
    the laser housing rests position-stable and self-centered due to gravity in the support array and
    the position of the longitudinal axis is equal.

2. The calibration device as claimed in claim 1, wherein:
    the laser housing and/or the support body are precision ground, smooth and surface hardened, wherein the laser housing and/or the support body:
        are made of high-speed steel, glass or ceramics, and/or
        are single piece units and/or
        are made of a material with a coefficient of thermal expansion in the range of 0 to $9 \cdot 10^{-6} K^{-1}$,
    and/or both ends of the laser housing are enclosed by a sleeve each, whereby the sleeves are precision ground, smooth and surface hardened, wherein each sleeve is designed as the race of a bearing or as a fixed ball bearing.

3. The calibration as claimed in claim 1, wherein:
    the points of support form lines parallel to the inserted direction wherefore
    the support body is designed as a block with a v-shaped support array and the laser housing is designed as a straight cylinder or
    the support body is designed as a u-shaped support array or as two bars parallel to each other and to the inserted direction, and the laser housing is designed as a straight cylinder or a straight prism,
    and/or the points of support are designed as single points spaced to each other wherefore the support body comprises single spheres providing the points of support.

4. The calibration device as claimed in claim 1, wherein:
    the laser source is designed as a line laser and/or the alignment of the laser source is adjustable.

5. The calibration device as claimed in claim 1, wherein:
    the laser housing comprises at least one marking on its external surface for indication of at least one rotational position, wherein the laser housing comprises:
    two, specifically clearly distinguishable, markings indicating two rotational positions which are separated by 180°.

6. The calibration device as claimed in claim 1, wherein:
    the laser housing comprises at least one marking on its external surface for indication of at least one rotational position, wherein the laser housing comprises an alignment reticle.

7. The calibration device as claimed in claim 1, wherein:
    the support body comprises at each end a stopper plate as limits of the support array in the inserted direction, wherein one stopper plate comprises alignment slots or a single mark for defined alignment of the laser housing to the support array.

8. A calibration method for calibration of a laser beam horizontal trueness testing device, wherein the method is carried out using the calibration device of claim 1, wherein the method comprises:
    determining an impinging position of the laser beam of the laser source on the position sensitive detector with the laser housing in at least two different rotational positions of a first face and at least one rotational position of a second opposing face each, resulting in a first, second and at least a third impinging position, and determining calibration parameters representing the point of true horizontality, based on the first, second and third impinging position.

9. The calibration method as claimed in claim 8, wherein the method further comprises:

determining at least two impinging positions of the laser beam with the laser housing in at least two different rotational positions in the second opposing face each, resulting in the third and a fourth impinging position, and determining calibration parameters from an average of the first, second, third and fourth impinging position.

10. The calibration method as claimed in claim 8, wherein the method further comprises:

cancelling out a cone error of the laser source based on two impinging positions of the laser beam with the laser housing in at least two different rotational positions in one face, whereby the rotation angle between the two different rotational positions is known.

11. The calibration method as claimed in claim 8, wherein the method further comprises:

cancelling out a cone error of the laser source based on at least three impinging positions of the laser beam with the laser housing in at least three different rotational positions in one face.

12. The calibration method as claimed in claim 8, wherein the method further comprises:

canceling out a plane error of the laser source based on the impinging positions of the laser beam in the first and second face.

13. The calibration method as claimed in claim 8, wherein the method further comprises:

determining at least one additional impinging position, of the laser beam of the laser source on the position sensitive detector for a known rotational position in azimuthal direction of the laser beam horizontal trueness testing device different to the rotational position underlying at least one other impinging position, and determining calibration parameters representing a yaw angle of the position sensitive detector, based on the additional impinging position.

14. The calibration method as claimed in claim 8, wherein the method further comprises:

a pre-step before determining a first impinging position, the pre-step comprising orienting the laser beam to the previously defined center of the position sensitive detector.

15. The method as claimed in claim 8 for a calibration device with a line laser as a laser source according to claim 4, wherein:

the rotation angle between two different rotational positions of the laser housing is determined based on the orientation of the laser line on the position sensitive detector in each rotational position.

16. Computer program product having program code which is stored on a machine-readable carrier, for controlling and carrying out the method for calibration according to claim 8.

17. A system comprising a calibration device as and non-transitory computer program product configured to execute the method according to claim 8.

18. The system as claimed in claim 17, wherein:

the system further comprises a laser beam horizontal trueness testing device, wherein the laser beam horizontal trueness testing device comprises a control unit, the control unit designed to execute the program code of the computer program product.

19. A calibration method for calibration of a laser beam horizontal trueness testing device according to claim 18, wherein the method is carried out using a calibration device, wherein the method further comprises:

determining an impinging position of the laser beam of the laser source on the position sensitive detector with the laser housing in a first rotational position and a second opposing rotational position each, of a first azimuthal orientation and a first face of the laser housing, resulting in a first and second impinging position, cancelling out a cone error of the laser source based on the first and second impinging position, determining an impinging position of the laser beam of the laser source on the position sensitive detector with the laser housing in at least one rotational position of a second opposing face, resulting in a third impinging position, determining calibration parameters representing the point of true horizontality based on the first, second and third impinging position, determining at least a fourth impinging position of the laser beam of the laser source on the position sensitive detector with the laser housing in a second azimuthal orientation different to the first one, and determining calibration parameters representing the scale and a yaw angle of the position sensitive detector, based on the first, second and fourth impinging position.

20. A calibration device for calibration of a laser beam horizontal trueness testing device, the laser beam horizontal trueness testing device comprising an inherent inclination compensator and a position sensitive detector for detecting an impinging position of a laser beam in dependency of the entry angle of the laser beam with regard to the horizontal, wherein the calibration device comprises an elongated laser housing with a longitudinal axis, a laser source, whereby the alignment of the laser source is such that a laser beam is emittable by the laser source at least roughly in direction of the longitudinal axis, and a compensator for horizontal levelling of the laser beam, wherein the laser housing is positioned on a unit, which is rotatable in azimuthal direction, in particular a turntable, with an angular position measurement system, by which the laser housing is orientatable in different azimuthal directions with known azimuthal angles.

* * * * *